(12) United States Patent
Gowdappa et al.

(10) Patent No.: US 10,210,174 B2
(45) Date of Patent: Feb. 19, 2019

(54) ENFORCING CONSISTENCY OF FILE TO STORAGE NODE MAPPING

(71) Applicant: Red Hat, Inc., Raleigh, NC (US)

(72) Inventors: Raghavendra Gowdappa, Bangalore (IN); Shyamsundar Ranganathan, Billerica, MA (US); Jeffrey Jon Darcy, Lexington, MA (US)

(73) Assignee: Red Hat, Inc., Raleigh, NC (US)

( * ) Notice: Subject to any disclaimer, the term of this patent is extended or adjusted under 35 U.S.C. 154(b) by 526 days.

(21) Appl. No.: 14/972,533

(22) Filed: Dec. 17, 2015

(65) Prior Publication Data

US 2017/0177611 A1    Jun. 22, 2017

(51) Int. Cl.
*G06F 17/30* (2006.01)

(52) U.S. Cl.
CPC ............... *G06F 17/30194* (2013.01)

(58) Field of Classification Search
None
See application file for complete search history.

(56) References Cited

U.S. PATENT DOCUMENTS

| | | | |
|---|---|---|---|
| 6,029,168 A | 2/2000 | Frey | |
| 6,539,495 B1* | 3/2003 | Elko | G06F 11/1666 711/112 |
| 7,206,836 B2 | 4/2007 | Dinker et al. | |
| 8,001,222 B2 | 8/2011 | Beck | |
| 8,209,290 B1* | 6/2012 | Dowers, II | G06F 17/30289 707/640 |
| 8,463,941 B1* | 6/2013 | Welch | H04L 67/2819 709/238 |
| 8,516,159 B2 | 8/2013 | Ananthanarayanan et al. | |
| 8,793,432 B2 | 7/2014 | Patnaik et al. | |
| 2012/0017114 A1* | 1/2012 | Timashev | G06F 11/1469 714/15 |
| 2013/0311426 A1 | 11/2013 | Erdogan et al. | |
| 2016/0140141 A1* | 5/2016 | Darcy | G06F 17/30203 707/827 |

FOREIGN PATENT DOCUMENTS

| | | |
|---|---|---|
| CN | 102855294 A | 1/2013 |
| CN | 103458044 A | 12/2013 |

OTHER PUBLICATIONS

Gowdappa, Raghavendra, "Change Ia285f25e: cluster/dht: synchronize with other concurrent healers while healing layout", review.gluster.org, Feb. 18, 2015, 2 pages.

(Continued)

*Primary Examiner* — Jason G Liao
(74) *Attorney, Agent, or Firm* — Lowenstein Sandler LLP (57) ABSTRACT

Systems and methods for enforcing consistency of file to storage node mappings in distributed file systems. An example method may include: receiving a request to perform a file operation with respect to a file associated with a volume of a distributed file system; identifying, among a plurality of storage nodes of the distributed file system, a storage node associated with the file; obtaining a lock of a layout of the volume; and responsive to determining, by a processing device, that a directory layout version number matches a volume layout version number, performing the requested file operation with respect to the file.

16 Claims, 8 Drawing Sheets

(56) References Cited

OTHER PUBLICATIONS

Tang, Hong et al. "An Efficient Data Location Protocol for Sefl-Organizing Storage Clusters", Department of Computer Science, University of California, Santa Barbara, CA, Nov. 15-21, 2003, 13 Pages.

Tang, Hong et al. "A Self-Organizing Storage Cluster for Parallel Data-Intensive Applications", SC 2004 Proceeding of the 2004 ACM/IEEE Conference on Supercomputing, p. 52.

* cited by examiner

ENFORCING CONSISTENCY OF FILE TO STORAGE NODE MAPPING

TECHNICAL FIELD

The present disclosure is generally related to computer systems, and is more specifically related to mapping files to storage nodes in distributed file systems.

BACKGROUND

In a distributed computer system, data objects (such as files) may be stored on a plurality of interconnected nodes in accordance with a storage architecture defining the data object placement and replication policies. The system efficiency and reliability may be significantly affected by the principles and design choices governing the storage architecture.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are methods and systems for enforcing consistency of file to storage node mappings in distributed file systems. In certain implementations, a distributed file system may be provided by a network attached storage (NAS) system comprising one or more storage nodes each having one or more persistent data storage devices, such as magnetic or optical storage disks, solid-state drives (SSDs), etc. "Storage node" herein shall be broadly interpreted as referring to any storage filesystem that is available for storing the files of a distributed file system.

Each file may be associated with a file system volume that includes multiple directories. The files of a given file system volume may be stored on a certain set of storage nodes. In certain implementations, directories of the distributed file system may exist on all nodes, while each file may exist on a single node only, which may be identified by hashing the file name using a pre-determined hash function, and then identifying a storage node that has been associated with the hash range to which the file name hash belongs. In certain implementations, the hash to storage node mapping may be done on a per-directory basis. Each file system client may store the distribute file system configuration (e.g., the mappings of hash ranges to storage nodes) locally, and use it for identifying a storage node for serving a particular file system request.

Certain changes of the distributed file system configuration (e.g., addition or removal of a storage node) would thus cause a corresponding modification of the hash range to storage node mappings, and would further cause physical migration of at least some of the files. In an illustrative example, if a storage node has been removed, the hash range that was associated with the removed storage node would be re-allocated among the remaining nodes, thus causing re-allocating some of the files in accordance with the new hash range allocation. In another illustrative example, adding a storage node would cause re-allocating the hash ranges (e.g., by evenly splitting the hash space among all nodes), which would in turn cause re-allocating some of the files in accordance with the new hash range allocation. Re-allocating hash ranges to nodes and migrating the files in accordance with the new mapping is referred herein as "re-balancing" operation.

Since the file system configuration (also referred herein as "layout"), including the hash ranges to node mapping, is stored locally by file system clients, a client that fails to update the locally stored layout may operate using an out-of-date layout. As a result, certain file system operations performed by such clients may produce inconsistent file system states. For example, a file creation operation performed by a client using an out-of-date layout may lead to the file being placed onto a storage node that is different from the storage node that would be identified by the file name hash using the current layout. Similar problems may be caused by other file operations that are performed by a client using an out-of-date layout (e.g., rename a file or remove a directory).

The present disclosure addresses the above noted and other deficiencies by providing systems and methods for enforcing consistency of file to storage node mappings in distributed file systems. In accordance with one or more aspects of the present disclosure, version numbers (also referred to as "generation numbers") may be associated with each directory associated with a certain volume, and also with the volume itself. A version number associated with a directory may be incremented every time the directory is re-balanced (e.g., when certain files are migrated from one storage node to another storage node to reflect an updated hash range to storage node allocation). A version number associated with a volume may be incremented every time the configuration of nodes associated with the volume is changed (e.g., when a storage node has been added or removed).

To enforce the consistency of file to storage node mappings, file system clients may be required to accompany file operation requests by the directory version associated with the latest layout stored by the client. Before performing the requested file operation, the storage node may compare the directory layout version supplied by the client with the volume layout version which is stored by the node. Should the directory layout version supplied by the client fall below the volume layout version stored by the node, the node may reject the file operation request and return a corresponding error code. The client recovery would involve re-reading the layout from an external source (e.g., from a storage node or from a peer client) and repeating the attempted file operation. Should the directory layout version supplied by the client match or exceed the volume layout version stored by the node, the node may perform the requested file operation.

The above-described approach assumes that the file system layout would not be changed until the file requested file operation is completed. However, that may not always be true, since the directory layout or the volume layout may be changed after the directory layout version and the volume layout version have been compared, but before the file operation has been completed. In order to enforce the layout freeze, a lock may be obtained on the volume layout before performing the version comparison. If the lock has been successfully obtained, the version number comparison may be performed and the file operation executed. After the successful completion of the file operation, the lock may be released, as described in more details herein below.

In certain implementations, a distributed file system operating in accordance with one or more aspects of the present disclosure may also provide certain high-availability functions, such as node-level replication, load balancing, etc.

Thus, the advantages of systems and methods operating in accordance with one or more aspects of the present disclosure include enforcing consistency of file to storage node mappings in distributed file systems, thus preventing file operation errors caused by an out-of-date file system layout which may be stored by one or more file system clients. Various aspects of the above referenced methods and systems are described in details herein below by way of examples, rather than by way of limitation.

Figure 1:
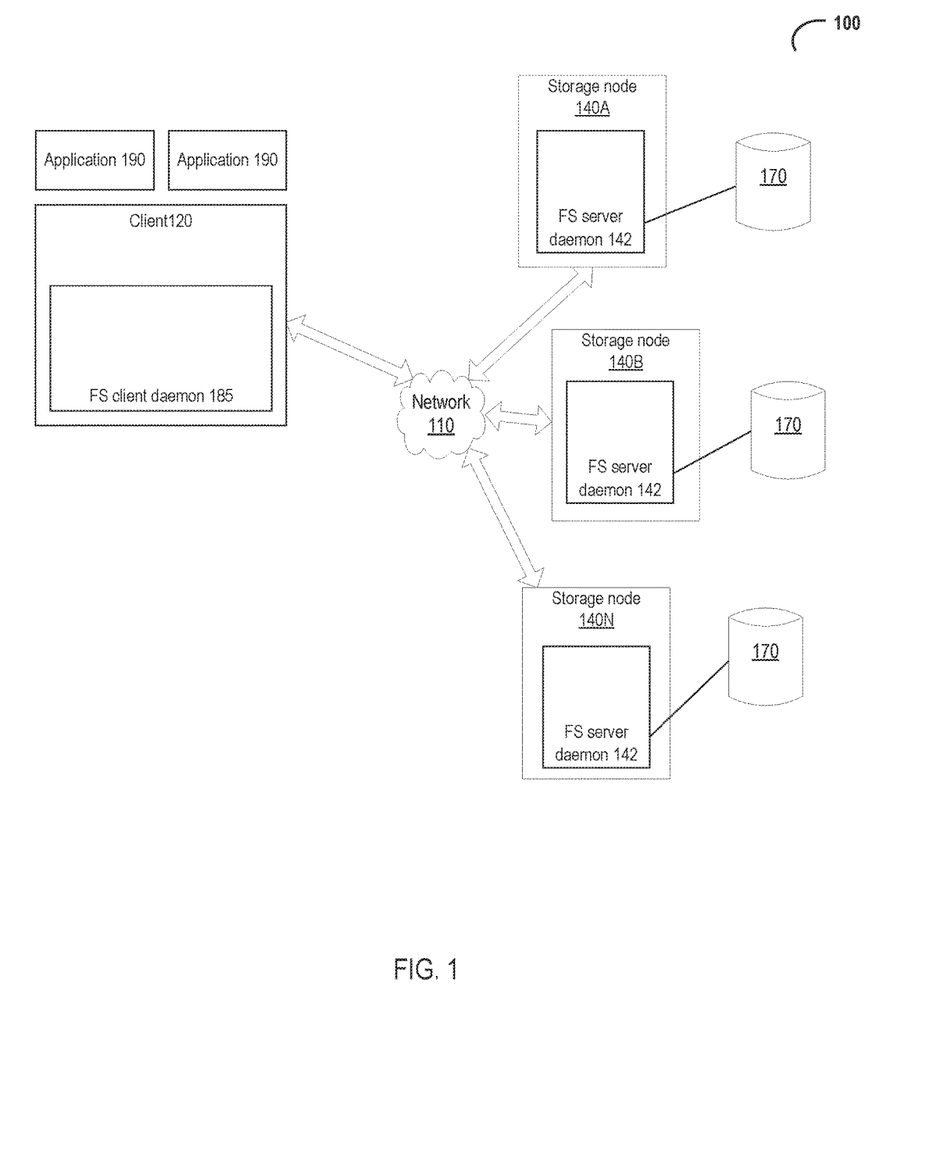
FIG. 1 schematically depicts a high-level component diagram of an example distributed file system operating in accordance with one or more aspects of the present disclosure.

FIG. 1 schematically depicts a high-level component diagram of an example distributed file system 100 operating in accordance with one or more aspects of the present disclosure. In certain implementations, distributed file system 100 may support data replication, load balancing, and other functions related to providing file system services.

Distributed file system 100 may include one or more storage nodes 140A-140N configured to individually and/or collectively service file access request (such as requests to create, access or modify a specified file). In an illustrative example of FIG. 1, each storage node 140 may be represented by a file system server having one or more data storage devices 170. "Data storage device" herein shall refer to a memory device, such as a disk, RAID array, EEPROM device, or any other device capable of storing data. While in FIG. 1 each storage node 140 is represented by a file system server, in alternative implementations, a storage node may be provided by any storage filesystem that is available for storing the files of a distributed file system. In certain implementations, one or more storage nodes may be collocated within a single file system server.

One or more client computers 120 may be communicatively coupled, e.g., over a network 110, to storage nodes 140. Network 110 may be provided by one or more local area networks, one or more wide area networks, or any combination thereof. Client computer 120 may be provided by a computer system including a processor, a memory, and at least one communication interface (the above noted components of client computer 120 are omitted from FIG. 1). Client computer 120 can execute one or more applications 190.

Storage node 140 may run a file system server daemon (or any other software component executable as one or more processes) 142 to export a local file system to clients 120. File system client daemon 185 running on client computers 120 may connect to storage nodes 140 via an application-level protocol implemented over TCP/IP, InfiniBand or other transports, and access the files exported by storage nodes 140. File system server daemon 142 and/or file system client daemon 185 may implement the layout locking functionality in accordance with one or more aspects of the present disclosure.

As noted herein above, each file may be associated with a file system volume that includes multiple directories. The files of a given file system volume may be stored on a certain set of storage nodes. In certain implementations, directories of the distributed file system may exist on all nodes, while each file may exist on a single node only. Each storage node may be assigned a range within a pre-defined hash space (e.g., a 32-bit hash space), so that the combination of all ranges matches the hash space with no gaps and no overlaps. For each file, exactly one storage node would have an assigned hash range that includes the hash value of the file name, and that is the node on which the file should be stored.

Figure 2:
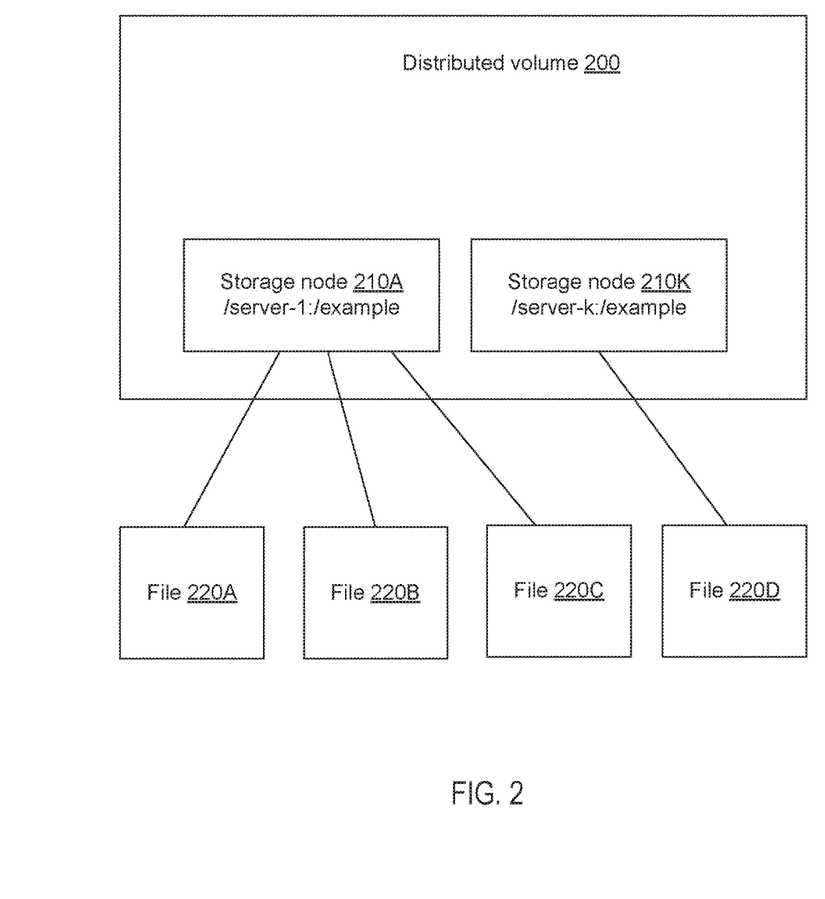
FIG. 2 schematically illustrates a logical view of a subset of a distributed file system operating in accordance with one or more aspects of the present disclosure.

FIG. 2 schematically illustrates a logical view of a subset of a distributed file system operating in accordance with one or more aspects of the present disclosure. In an illustrative example, a distributed volume 200 may comprise two or more storage nodes 210A-210K represented by respective filesystems server1:/exp1 and server2:/exp2. The distributed filesystem may store a plurality of files 220A-220N, such that each file may be stored on a storage node identified by hashing the file name using a pre-determined hash function, and then identifying a storage node that is associated with the hash range to which the file name hash belongs.

In certain implementations, the hash to storage node mapping may be done on a per-directory basis. In an illustrative example, all hash ranges may have the same size. Alternatively, to compensate for possible differences in the sizes of available space on the storage nodes, the hash ranges may have different sizes, e.g., proportional to the available storage space sizes on the storage nodes.

Each file system client may store the distribute file system configuration (e.g., the mappings of hash ranges to storage nodes) locally, and use it for identifying a storage node for serving a particular file system request.

Figure 3A:
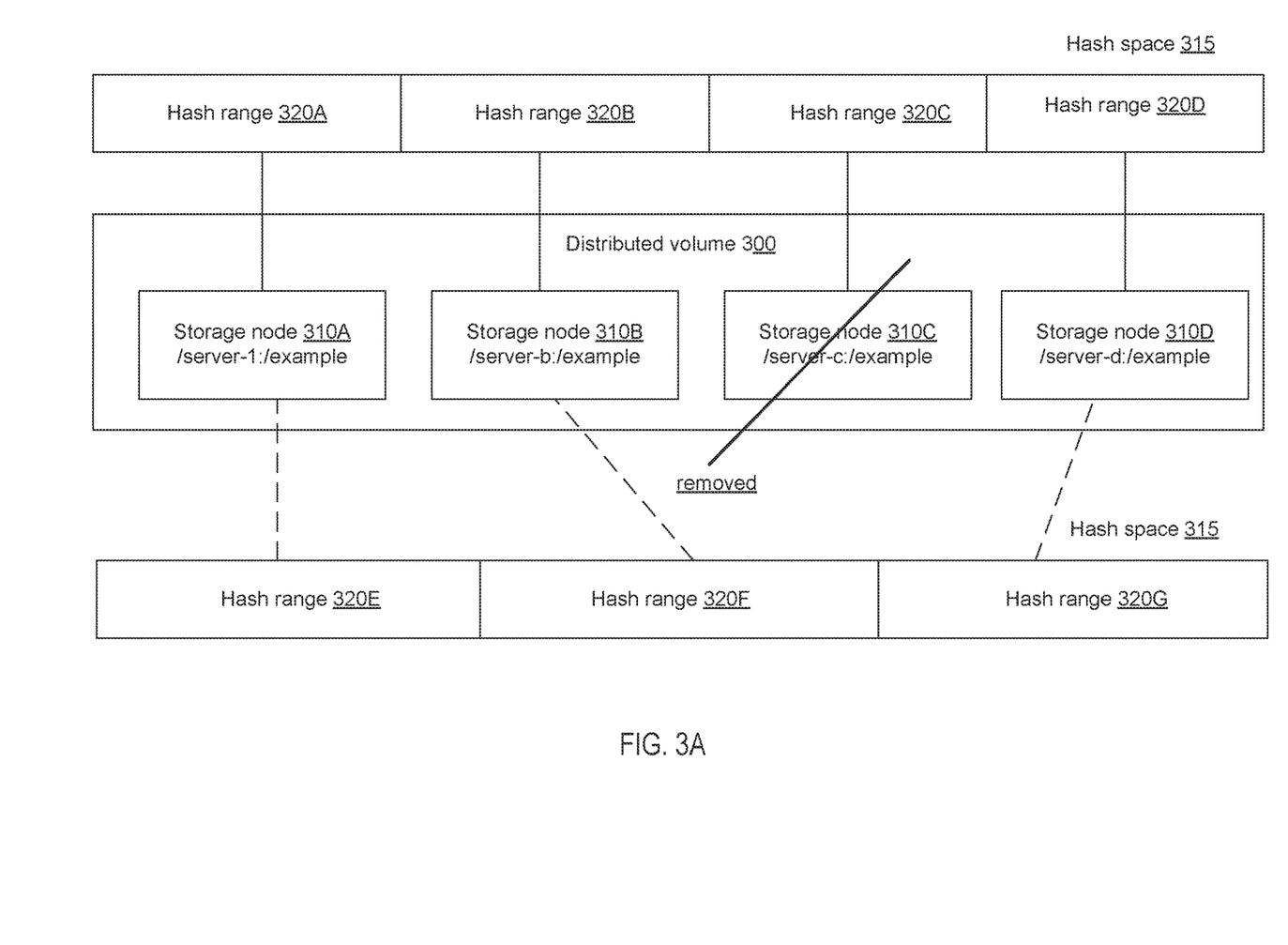
FIGS. 3A-3B schematically illustrate examples of modifications of the distributed file system configuration involving re-allocating hash ranges to nodes and migrating the files, in accordance with one or more aspects of the present disclosure.
Figure 3B:
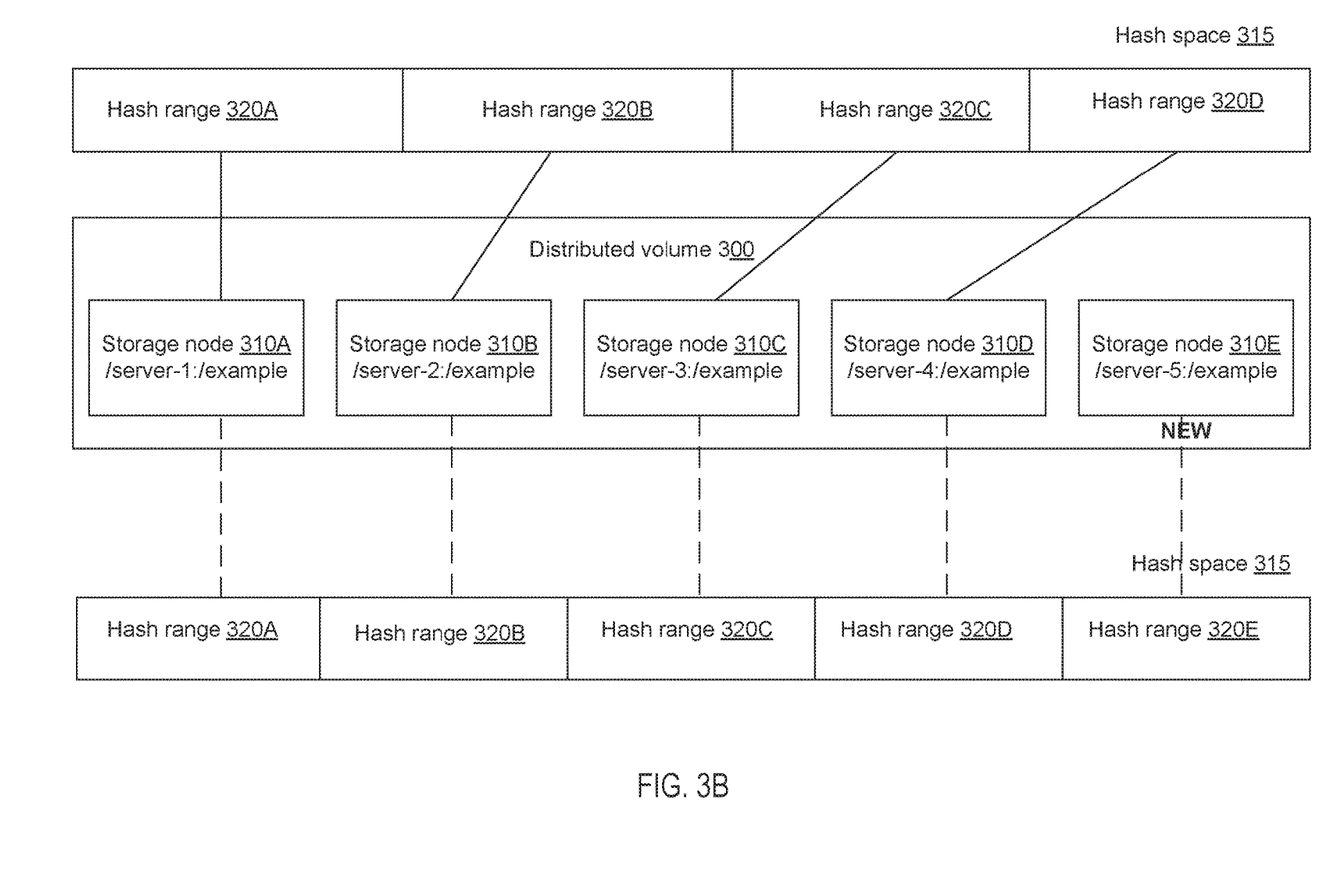

As noted herein above, certain changes of the distributed file system configuration (e.g., addition or removal of a storage node) may cause a corresponding modification of the hash range to storage node mappings, and may further cause physical migration of at least some of the files. FIGS. 3A-3B schematically illustrate examples of modifications of the distributed file system configuration involving re-allocating hash ranges to nodes and migrating the files, in accordance with one or more aspects of the present disclosure.

As schematically illustrated by FIG. 3A, a distributed file system volume 300 may be associated with storage nodes 310A-310D. The hash space 315 may be evenly split among the nodes into the corresponding ranges 320A-320D. Removal of storage node 310C may cause re-allocation of hash space 315 between the remaining nodes 310A, 310B, and 310D by the corresponding ranges 320E-320G. Reallocation of the storage ranges may, in turn, cause migration of the files in accordance with the new range allocation, so that each file would be stored on the node associated with the newly allocated hash range to which the file name hash belongs.

As schematically illustrated by FIG. 3B, a distributed file system volume 300 may be associated with storage nodes 310A-310D. Hash space 315 may be evenly split among the nodes into the corresponding ranges 320A-320D. Addition of a new storage node 310E may cause re-allocation of hash space 315 between the new set of nodes by the corresponding ranges 320E-320K. Reallocation of the storage ranges may, in turn, cause migration of the files in accordance with the new range allocation, so that each file would be stored on the node associated with the newly allocated hash range to which the file name hash belongs.

In certain implementations, the new hash to storage node mapping may be done on a per-directory basis. As schematically illustrated by FIGS. 3A-3B, the range re-allocation may produce the new hash ranges having the same size. Alternatively, to compensate for possible differences in the sizes of available space on the storage nodes, the range re-allocation may produce the new hash ranges having different sizes, e.g., proportional to the available storage space sizes on the remaining storage nodes.

Since the distributed file system configuration (also referred herein as "layout"), including the hash ranges to node mapping, is stored locally by file system clients, a client that fails to update the locally stored layout may operate using an out-of-date layout. As a result, certain file system operations performed by such clients may produce inconsistent file system states. For example, a file creation operation performed by a client using an out-of-date layout may lead to the file being placed onto a storage node that is different from the storage node that would be identified by the file name hash using the current layout. Similar problems may be caused by other file operations that are performed by a client using an out-of-date layout (e.g., rename a file or remove a directory).

As noted herein above, consistency of file to storage node mappings in distributed file systems may be enforced by introducing version numbers (also referred to as "generation numbers") that may be associated with each directory associated with a certain volume, and also with the volume itself. A version number associated with a directory may be incremented every time the directory is re-balanced (e.g., when certain files are migrated from one storage node to another storage node to reflect an updated hash range to storage node allocation). A version number associated with a volume may be incremented every time the configuration of nodes associated with the volume is changed (e.g., when a storage node has been added or removed).

Figure 4A:
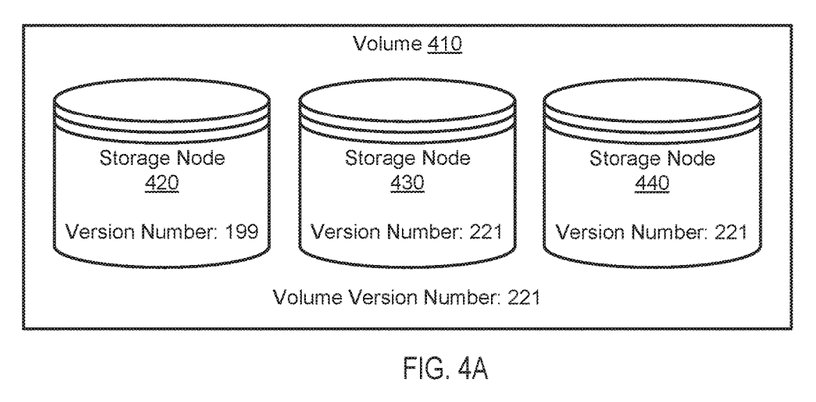
FIGS. 4A-4C schematically illustrate several examples of using layout version numbers in a distributed file system, in accordance with one or more aspects of the present disclosure.
Figure 4B:
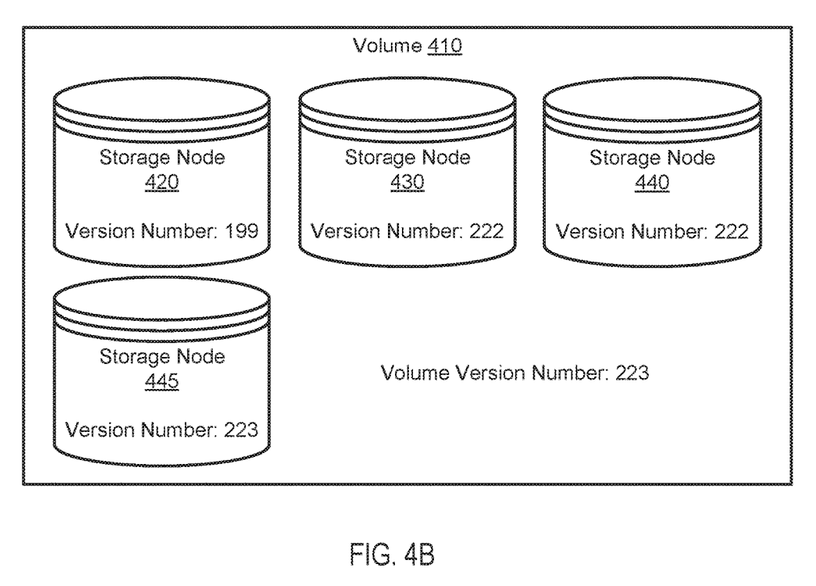
Figure 4C:
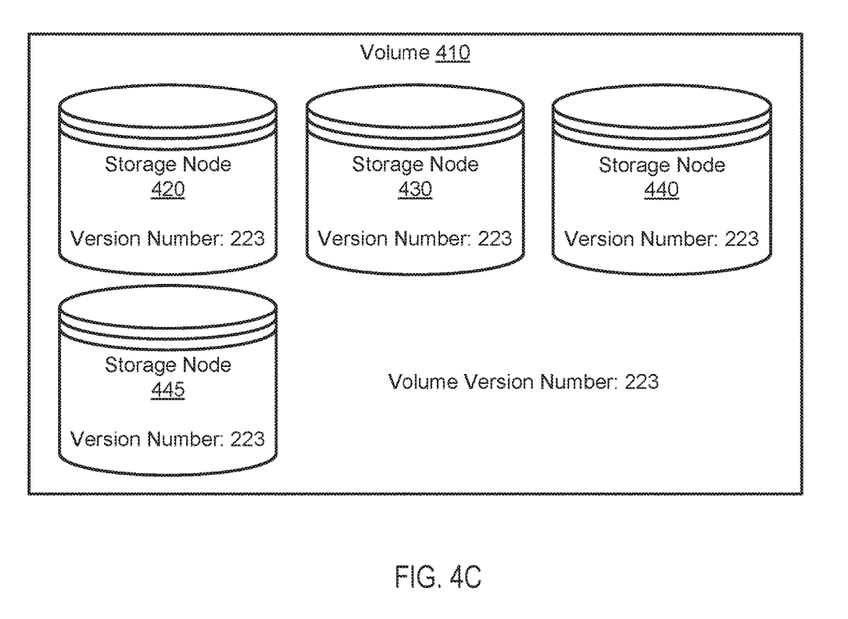

FIGS. 4A-4C schematically illustrate several examples of using layout version numbers in a distributed file system, in accordance with one or more aspects of the present disclosure. As shown in FIG. 4A, the distributed file system may include storage nodes 420, 430, and 440 that are associated with at least some of the directories of volume 410. A volume version number may be assigned to volume 410, and a directory version number may be assigned to each directory.

As shown in FIG. 4A, the volume version number assigned to volume 410 are identical to the directory version numbers assigned to an example directory on storage nodes 430 and 440. Accordingly, in the example of FIG. 4A, the volume layout has not been updated since storage nodes 430 and 440 were re-balanced. However, the example directory version number on storage node 420 is less than the volume version number. Accordingly, in the example of FIG. 4A, storage node 420 has not been re-balanced since the configuration of the volume was changed.

As shown in FIG. 4B, a new storage node 445 has been associated with volume 410, thus causing the volume version number to be incremented to reflect the volume layout change event. In the example of FIG. 4B, directory version numbers for the example directory on storage nodes 420, 430, and 440 have not yet been changed.

The change of the directory version numbers for the example directory on storage nodes 420, 430, and 440 is reflected by FIG. 4C. As shown, the directory version numbers for the example directory on storage nodes 420, 430, and 440 have been updated to match the volume version number for volume 410 after the re-balancing operation involving migration of certain files between the storage nodes 420, 430, 440, and 445 in accordance with the new volume layout has been performed.

As noted herein above, distributed file system clients may be required to accompany file operation requests by the directory version associated with the latest layout stored by the client. Before performing the requested file operation (e.g., create a file in a specified directory), the storage node may compare the directory layout version supplied by the client with the volume layout version which is stored by the node. Should the directory layout version supplied by the client fall below the volume layout version stored by the node (e.g., as illustrated by the example of FIG. 4B), the node may reject the file operation request and return a corresponding error code. Otherwise, if the directory layout version supplied by the client matches or exceeds the volume layout version stored by the node (e.g., as illustrated by the example of FIG. 4C), the node may proceed to perform the requested file operation.

The above-described approach assumes that the file system layout would not be changed until the file requested file operation is completed. However, that may not always be true, since the directory layout or the volume layout may be changed, unbeknownst to the client that has requested the file operation and/or the storage node executing the file operation, after the directory layout version and the volume layout version have been compared, but before the file operation has been completed. In order to enforce the layout freeze, a lock may be obtained on the volume layout before performing the version comparison. If the lock has been successfully obtained, the version number comparison may be performed and the file operation may be executed. After the successful completion of the file operation, the lock of the volume layout may be released.

In certain implementations, the layout lock may be obtained and the version comparison may be performed by the storage node upon receiving a file operation request from a client. Alternatively, in order to allow for efficient execution client-size transactions involving a sequence of file operations, a file system client may transmit a layout lock and version comparison request followed by one or more file operation requests and then followed by layout unlock request.

Responsive to receiving the layout lock and version comparison request, the storage node may attempt to obtain the volume layout lock. If the volume layout lock has been successfully obtained, the storage node may compare the directory layout version and the volume layout version. Should the directory layout version supplied by the client match or exceed the volume layout version stored by the node, the node may perform the requested file operations. Responsive to receiving the layout unlock request, the node may release the layout lock. To further improve the overall operation efficiency, the unlocking may be performed asynchronously with respect to responding back to the client.

In certain implementations, the scope of the lock may be limited to the storage node that is associated with the hash range to which the hash of the file name belongs, thus further improving the overall efficiency of the distributed file system operations by allowing multiple clients simultaneously perform certain file operations with respect to files the file name hashes of which identify different storage nodes.

Figure 5:
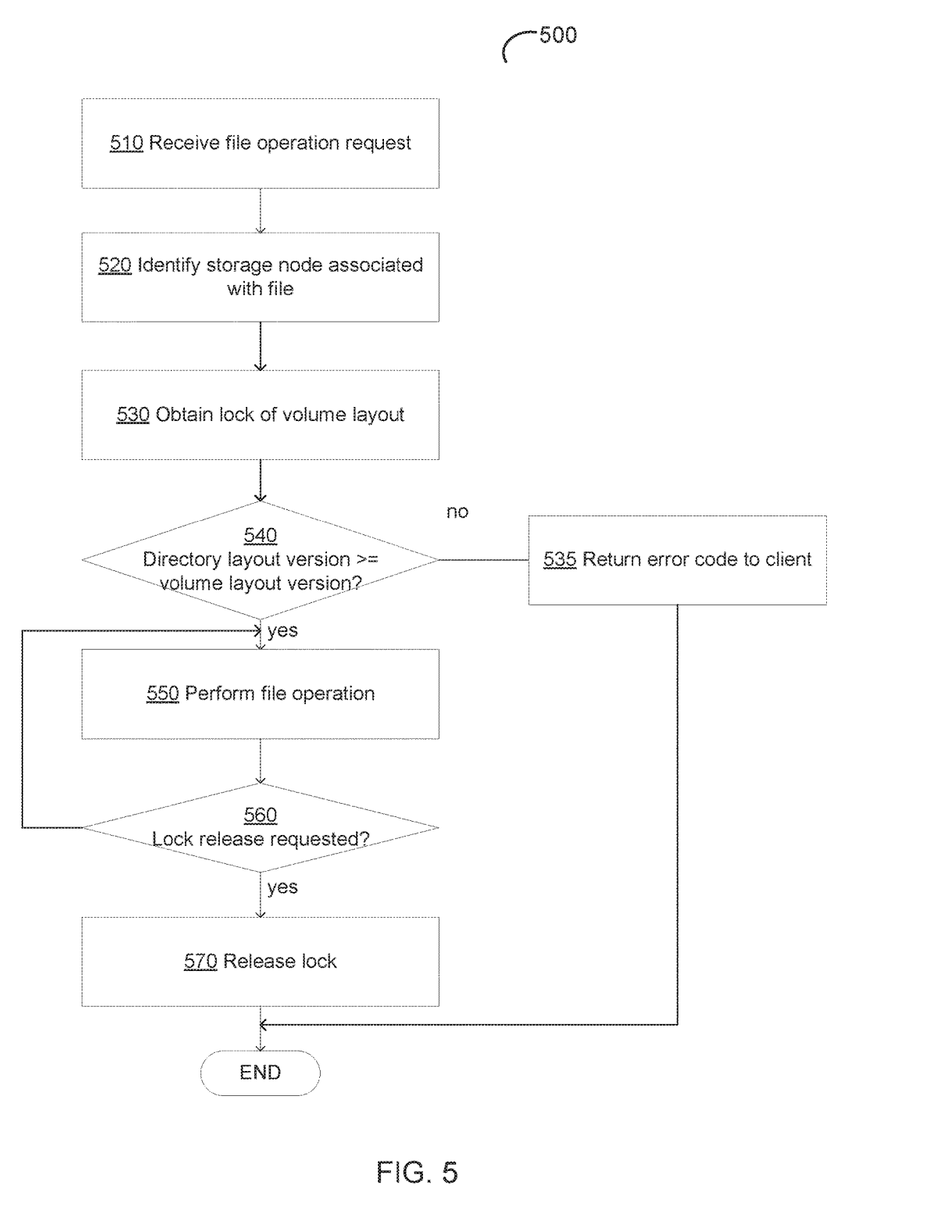
FIG. 5 depicts a flow diagrams of an example method for performing a file operation in a distributed file system, in accordance with one or more aspects of the present disclosure.

FIG. 5 depicts a flow diagram of an example method 500 performed by a processing device of a storage node of a distributed file system for performing a file operation in accordance with one or more aspects of the present disclosure. Method 500 and/or each of its individual functions, routines, subroutines, or operations may be performed by one or more processors of the computer system (e.g., file storage node 150 of FIG. 1) executing the method. In certain implementations, method 500 may be performed by a single processing thread. Alternatively, method 500 may be performed by two or more processing threads, each thread executing one or more individual functions, routines, subroutines, or operations of the method. In an illustrative example, the processing threads implementing method 500 may be synchronized (e.g., using semaphores, critical sections, and/or other thread synchronization mechanisms). Alternatively, the processing threads implementing method 500 may be executed asynchronously with respect to each other.

At block 510, a processing device of a storage node of a distributed file system may receive a request to perform a file operation with respect to a file associated with a volume of a distributed file system. In certain implementations, the request may comprise the directory version number that reflects the latest re-balancing operation with respect to the directory associated with the file. The directory version number may be incremented every time when the directory is re-balanced (e.g., when certain files are migrated from one storage node to another storage node to reflect an updated hash range to storage node allocation), as described in more details herein above.

At block 520, the processing device may identify, among a plurality of storage nodes of the distributed file system, a storage node associated with the file. In an illustrative example, the storage node may be identified by hashing the file name using a pre-determined hash function, and then identifying a storage node that has been associated with the hash range to which the file name hash belongs, as described in more details herein above.

At block 540, the processing device may obtain a lock of the volume layout. In certain implementations, the scope of the lock may be limited to the storage node that is associated with the hash range to which the hash of the file name belongs, thus further improving the overall efficiency of the distributed file system operations by allowing multiple clients simultaneously perform certain file operations with respect to files the file name hashes of which identify different storage nodes, as described in more details herein above.

Responsive to determining, at block 540, that a directory layout version number matches a volume layout version number, the processing device may, at block 550, perform the requested file operation. In order to allow for efficient execution client-size transactions involving a sequence of file operations, a file system client may transmit a layout lock and version comparison request followed by one or more file operation requests and then followed by layout unlock request, as described in more details herein above.

Responsive to receiving, at block 560, the lock release request from the file system client, the processing device may, at block 570 release the lock of the volume layout. To further improve the overall operation efficiency, the unlocking may be performed asynchronously with respect to responding back to the client, as described in more details herein above. Thus, responsive to acknowledging the lock release request the method may terminate.

Figure 6:
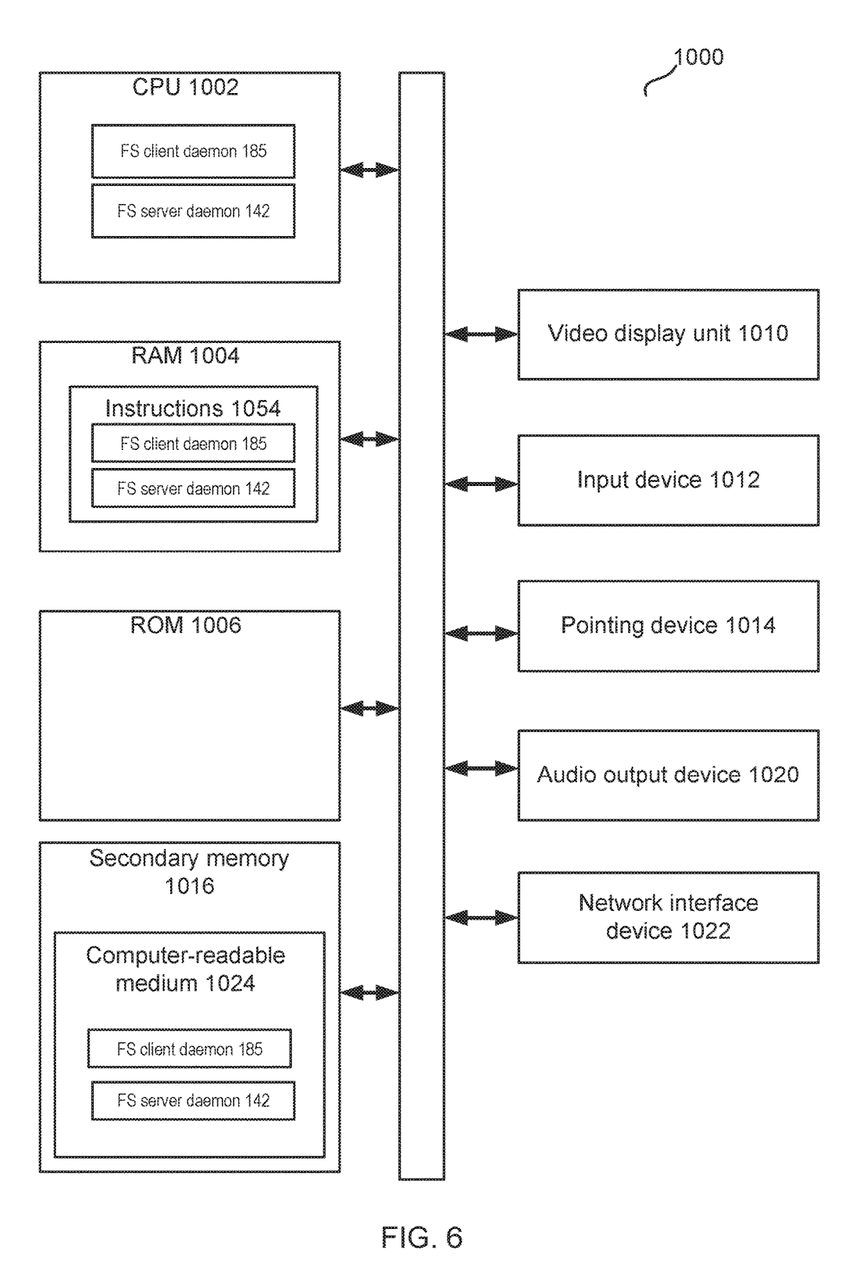
FIG. 6 depicts an illustrative computer system operating in accordance with one or more aspects of the present disclosure.

FIG. 6 depicts an illustrative computer system operating in accordance with examples of the present disclosure. In illustrative examples, computer system 1000 may correspond to storage node 140 or file system client 120 of FIG. 1.

In one example, computer system 1000 may be connected (e.g., via a network, such as a Local Area Network (LAN), an intranet, an extranet, or the Internet) to other computer systems (e.g., other nodes). Computer system 1000 may operate in the capacity of a server or a client computer in a client-server environment, or as a peer computer in a peer-to-peer or distributed network environment. Computer system 1000 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, computer system 1000 may include a processor 1002, a volatile memory 1004 (e.g., random access memory (RAM)), a non-volatile memory 1006 (e.g., read-only memory (ROM) or electrically-erasable programmable ROM (EEPROM)), and a storage memory 1016 (e.g., a data storage device), which may communicate with each other via a bus 1008.

Processor 1002 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 1000 may further include a network interface device 1022. Computer system 1000 also may include a video display unit 1010 (e.g., an LCD), an alpha-numeric input device 1012 (e.g., a keyboard), a pointing device 1014 (e.g., a mouse), and an audio output device 1020 (e.g., a speaker).

In an illustrative example, secondary memory 1016 may include a tangible computer-readable storage medium 1024 on which may be stored instructions 1054 encoding file system server daemon 142 implementing method 500 for performing a file operation in a distributed file system in accordance with one or more aspects of the present disclosure. In another illustrative example, secondary memory 1016 may include a tangible computer-readable storage medium 1024 on which may be stored instructions 1054 encoding file system client daemon 185 for performing a file operation in a distributed file system in accordance with one or more aspects of the present disclosure. Instructions 1054 may also reside, completely or partially, within main memory 1004 and/or within processor 1002 during execution thereof by computer system 1000, hence, main memory 1004 and processor 1002 may also constitute machine-readable storage media.

While computer-readable storage medium 1024 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

Unless specifically stated otherwise, terms such as "updating", "identifying", "determining", "sending", "assigning", or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300, 400 and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

The invention claimed is:

1. A method, comprising:
   receiving a request to perform a file operation with respect to a file associated with a volume of a distributed file system;
   identifying, among a plurality of storage nodes of the distributed file system, a storage node associated with the file;
   identifying a directory layout version number reflecting a latest re-balancing operation with respect to the directory;
   identifying a volume layout version number reflecting a latest modification of a layout of the volume; and
   obtaining a lock of a layout of the volume;
   responsive to determining, by a processing device, that the directory layout version number matches the volume layout version number, performing the requested file operation with respect to the file.

2. The method of claim 1, further comprising:
   releasing the lock of the volume.

3. The method of claim 1, wherein the directory layout version number is specified by the request to perform the file operation.

4. The method of claim 1, wherein identifying the storage node associated with the file comprises:
   determining a value of a pre-defined hash function of a name of the file; and
   identifying, among a plurality of storage nodes of the distributed file system, a storage node associated with a hash range to which the value belongs.

5. The method of claim 4, wherein identifying the storage node associated with a hash range to which the value belongs is performed in view of a directory-specific hash to storage node mapping.

6. The method of claim 1, further comprising:
   associating a range of hash values with each storage node of a cluster of storage nodes.

7. The method of claim 1, wherein obtaining the lock of the layout of the volume is performed with respect to a storage node associated with a hash range to which a value of a pre-defined hash function of a name of the file belongs.

8. A system, comprising:
   a memory; and
   a processing device, coupled to the memory, to:
     receive a request to perform a file operation with respect to a file associated with a volume of a distributed file system;
     identify, among a plurality of storage nodes of the distributed file system, a storage node associated with the file;
     obtain a lock of a layout of the volume; and
     responsive to determining that a directory layout version number matches a volume layout version number, perform the requested file operation with respect to the file.

9. The system of claim 8, wherein the processing device is further to:
   release the lock of the volume.

10. The system of claim 8, wherein the directory layout version number is specified by the request to perform the file operation.

11. The system of claim 8, wherein to identify the storage node associated with the file, the processing device is further to:
    determine a value of a pre-defined hash function of a name of the file; and
    identify, among a plurality of storage nodes of the distributed file system, a storage node associated with a hash range to which the value belongs.

12. The system of claim 8, wherein the processing device is to obtain the lock of the layout of the volume with respect to a storage node associated with a hash range to which a value of a pre-defined hash function of a name of the file belongs.

13. A non-transitory computer-readable storage medium comprising executable instructions that, when executed by a processing device, cause the processing device to:
- receive a request to perform a file operation with respect to a file associated with a volume of a distributed file system;
- determine a value of a pre-defined hash function of a name of the file; and
- identify, among a plurality of storage nodes of the distributed file system, a storage node associated with a hash range to which the value belongs;
- obtain a lock of a layout of the volume; and
- responsive to determining, by the processing device, that a directory layout version number matches a volume layout version number, perform the requested file operation with respect to the file.

14. The non-transitory computer-readable storage medium of claim 13, further comprising executable instructions that cause the processing device to:
- release the lock of the volume.

15. The non-transitory computer-readable storage medium of claim 13, wherein the directory layout version number is specified by the request to perform the file operation.

16. The non-transitory computer-readable storage medium of claim 13, wherein obtaining the lock of the layout of the volume is performed with respect to a storage node associated with a hash range to which a value of a pre-defined hash function of a name of the file belongs.

* * * * *